US011321823B2

(12) United States Patent
Weinstein et al.

(10) Patent No.: US 11,321,823 B2
(45) Date of Patent: May 3, 2022

(54) METHODS AND SYSTEMS FOR THERMAL IMAGING OF MOVING OBJECTS

(71) Applicant: YORAN IMAGING LTD., Timrat (IL)

(72) Inventors: Yoav Weinstein, Atlit (IL); Eran Sinbar, Misgav (IL)

(73) Assignee: YORAN IMAGING LTD., Timrat (IL)

( * ) Notice: Subject to any disclaimer, the term of this patent is extended or adjusted under 35 U.S.C. 154(b) by 0 days.

(21) Appl. No.: 16/968,863

(22) PCT Filed: Feb. 5, 2019

(86) PCT No.: PCT/IL2019/050139
§ 371 (c)(1),
(2) Date: Aug. 10, 2020

(87) PCT Pub. No.: WO2019/162933
PCT Pub. Date: Aug. 29, 2019

(65) Prior Publication Data
US 2021/0049752 A1   Feb. 18, 2021

Related U.S. Application Data

(60) Provisional application No. 62/633,132, filed on Feb. 21, 2018.

(51) Int. Cl.
*G06T 7/00* (2017.01)
*G06T 7/70* (2017.01)
(Continued)

(52) U.S. Cl.
CPC ............ *G06T 7/0004* (2013.01); *B65B 51/10* (2013.01); *B65B 57/00* (2013.01); *G01J 1/42* (2013.01);
(Continued)

(58) Field of Classification Search
CPC .................... G06T 7/0004; G06T 7/70; G06T 2207/10048; G06T 2207/30108;
(Continued)

(56) References Cited

U.S. PATENT DOCUMENTS 5,029,463 A   7/1991   Schvester et al.
5,150,605 A   9/1992   Simpson
(Continued)

FOREIGN PATENT DOCUMENTS

CA         3032888 A1    8/2018
DE    102014216576 A1    2/2016
(Continued)

OTHER PUBLICATIONS

PCT Search Report for International Application No. PCT/IL2019/050139 dated May 20, 2019, 5 pp.
(Continued)

*Primary Examiner* — David P Porta
*Assistant Examiner* — Meenakshi S Sahu
(74) *Attorney, Agent, or Firm* — The Roy Gross Law Firm, LLC; Roy Gross

(57) ABSTRACT

Method and system for determining sealing integrity and/or contamination of the sealing region by the filling material of a heat-sealed container, including imaging at least a part of a sealing region of the container using an imaging camera; wherein the imaging is performed during movement and/or transport of the container at a predetermined speed; and wherein the imaging is performed while moving the field of view of the camera in a same direction as the container, wherein the moving of the field of view is configured to reduce the velocity of the container relative to the imaging camera sufficiently to reduce smearing of images obtained.

20 Claims, 4 Drawing Sheets

(51) Int. Cl.
*B65B 51/10* (2006.01)
*B65B 57/00* (2006.01)
*G01M 3/04* (2006.01)
*G01J 5/00* (2006.01)
*G01J 1/42* (2006.01)
*H04N 5/232* (2006.01)

(52) U.S. Cl.
CPC ............... *G01J 5/00* (2013.01); *G01M 3/04* (2013.01); *G06T 7/70* (2017.01); *G06T 2207/10048* (2013.01); *G06T 2207/30108* (2013.01); *H04N 5/23299* (2018.08)

(58) Field of Classification Search
CPC .... G01J 1/42; G01J 5/00; B65B 51/10; B65B 57/00; G01M 3/04; G01M 3/002; G01M 3/38; H04N 5/23299; G01N 25/72; G01N 21/71; G01N 21/3563
See application file for complete search history.

(56) References Cited

U.S. PATENT DOCUMENTS

| | | | |
|---|---|---|---|
| 7,434,372 | B2 | 10/2008 | Vanhamel et al. |
| 7,567,828 | B1 | 7/2009 | Burson |
| 2002/0166983 | A1* | 11/2002 | Katzir ............... G01N 21/956 250/559.45 |
| 2005/0111726 | A1 | 5/2005 | Hackney et al. |
| 2005/0286606 | A1* | 12/2005 | Ignatowicz ......... B29C 65/8261 374/4 |
| 2009/0159798 | A1 | 6/2009 | Weida et al. |
| 2010/0018941 | A1 | 1/2010 | Kerr et al. |
| 2016/0054245 | A1 | 2/2016 | Weinstein et al. |
| 2016/0238373 | A1* | 8/2016 | Featherstone .......... G01B 11/24 |
| 2018/0036144 | A1 | 2/2018 | Radspieler |

FOREIGN PATENT DOCUMENTS

| | | |
|---|---|---|
| EP | 0355699 A2 | 2/1990 |
| EP | 3588065 A1 | 1/2020 |
| JP | S6228650 A | 2/1987 |
| JP | 2009-184724 A | 8/2009 |
| JP | 6229193 B1 | 11/2017 |
| WO | 2014195943 A1 | 12/2014 |
| WO | 2015140797 A2 | 9/2015 |
| WO | 20180150415 A1 | 8/2018 |

OTHER PUBLICATIONS

PCT Written Opinion for International Application No. PCT/IL2019/050139 dated May 20, 2019, 4 pp.
PCT Preliminary Report on Patentability for International Application No. PCT/IL2019/050139 dated Aug. 27, 2020, 5 pp.

* cited by examiner

METHODS AND SYSTEMS FOR THERMAL IMAGING OF MOVING OBJECTS

CROSS REFERENCE TO RELATED APPLICATIONS

This application is a National Phase of PCT Patent Application No. PCT/IL2019/050139 having International filing date of Feb. 5, 2019, which claims the benefit of priority of U.S. Provisional Application No. 62/633,132 filed on Feb. 21, 2018. The contents of the above applications are all incorporated by reference as if fully set forth herein in their entirety.

FIELD OF THE INVENTION

This invention relates to a method and system for thermal imaging of moving objects. Specifically, the invention relates to determining package integrity and/or sealing efficiency of moving containers, such as, but not limited to, containers moving on a package line.

BACKGROUND OF THE INVENTION

The integrity of a packaged product is critical for maintaining product quality until it reaches the end user. Defects in hermeticity of a package may cause contamination, introduction of moisture, etc., which may result in loss of quality and even pose a safety hazard. It is therefore important to ensure the integrity of the packaged products at least at the end of their production process.

Currently, there are various techniques to verify the integrity of a produced package. Most typically the evaluation is based on sporadic testing physical examination.

U.S. Pat. No. 5,029,463 et al. describes a leak detection device for in-line measurement of package integrity.

U.S. Pat. No. 5,150,605 describes a method for determining proper sealing of a hermetically sealed package.

U.S. Pat. No. 7,434,372 et al. describes a package integrity test comprising, inter alia, pressurizing the package with a gas and monitoring pressure to determine package integrity.

U.S. Pat. No. 7,565,828 describes apparatus and methods for testing package integrity and/or seal strength.

EP 0 355 699 describes a method for inspecting leakage of a sealed container. The method comprises changing an internal pressure of a vacuum chamber provided therein with an eddy-current displacement sensor to a predetermined degree of vacuum from a normal pressure after putting a sealed container having a conductive material at least at a portion to be inspected in the chamber; detecting an amount of expansion of the sealed container at the degree of vacuum in time sequence by the eddy-current displacement sensor; and determining any aging change in the amount of expansion after a time when the detected amount of expansion shows the maximum value, thereby to find out any pin hole formed in the sealed container.

WO 2014/195943 describes a method and system for determining integrity of a product. The method comprises; (a) placing the product between at least one radiation emitting body and one infra-red sensing arrangement comprising at least one IR sensor, the product comprises a housing being essentially transparent to IR radiation; (b) while the product is at a steady state temperature which is different from the temperature of the radiation emitting body, creating a sensing session comprising sensing by the at least one IR sensor, radiation emitted from the radiation emitting body, at least a portion of the emitted radiation being transmitted through the housing of the product, and (c) generating IR data from the sensed radiation, the IR data being indicative of the integrity of the product; wherein the product is spaced apart from at least the radiation emitting body, such that no contact exists there between.

SUMMARY OF THE INVENTION

This present disclosure relates to a method and system for thermal imaging of moving objects. Specifically, the invention relates to determining package integrity and/or sealing efficiency of moving containers, such as, but not limited to, containers moving on a package line.

Many package seals are formed by applying or melting adhesives or by melting the packaging material together using conduction, induction heating or ultrasonic welding methods.

Complete and lasting sealing is a critical stage of most packaging processes, and sealing integrity needs to be inspected/tested in order to avoid messy leaks, costly product returns, damage to the product itself and/or damage to brand reputation. Packaging lines typically run at a fast pace, making traditional leak testing methods, such as a vacuum or pressure decay testing, or squeezing, too slow, too expensive and impractical. Moreover, these leak testing methods are based on statistical sampling and typically enable monitoring the sealing process itself (i.e. temperature applied). Most often, these tests are incapable of detecting improper sealing during the transport of the package along a package line.

Thermal imaging (also known by the term "thermographic imaging") is a type of infrared (IR) imaging in which radiation emitted from a substance is detected based on the temperature and emissivity at one or more locations across the substance (according to Black Body radiation law), and IR images are produced according to the detected temperatures and emissivity. Typically, the amount of radiation emitted by a substance increases with temperature. Therefore, thermography allows detecting variations in temperature and/or emissivity of a substance. For example, when viewed by a thermographic camera, warm objects can be differentiated from cooler backgrounds. Similarly, because of differences in emissivity, liquid based materials (including liquids, creams, pastes, foams, etc.) can be differentiated from dry products (e.g. the packaging material) using thermal imaging.

Monitoring sealing efficiency and/or identifying contamination of the sealing region by the filling material of a moving object (e.g. a sealed package leaving the heat sealing station) with a thermal imaging camera (e.g. VOx. Bolometer, 640×480 pixels array, based thermal imaging IR camera), may, above a certain speed, cause smearing of the thermal image, due to insufficient thermal relaxation time of the bolometer. The smearing of the thermal image then again decreases the spatial high frequency of the thermal image, reducing the spatial sensitivity of the system. Moreover, the short exposure time of the thermal camera to the moving object decreases the thermal signal to noise ratio.

Advantageously the system and method, disclosed herein, provides mobile thermal imaging, in which the field of view of an imaging camera is moved along the movement of a screened package, thereby decreasing the velocity of the package relative to the imaging camera, thus decreasing the smearing effect and/or increasing the exposure time. Moving the field of view may involve moving the imaging camera along with the screened package. Additionally or alternatively, the effect of reducing the relative velocity, and thus reducing smearing in the thermal image, can also be achieved utilizing a stationary thermal camera in conjunction with a mobile and/or rotating optical element (e.g. a gold coated mirror). The mobile and/or rotating optical element is configured to move the field of view of the camera concurrently with the movement of the object, thus retaining the object steady within the field of view of the camera, thereby reducing false negative as well as false positive evaluation of the container's sealing integrity and/or contamination of the sealing region by the filling material.

According to some embodiments, there is provided a method for determining sealing integrity of a heat-sealed container, the method comprising imaging at least a part of a sealing region of the container using at least one imaging camera operative at a wavelength in the range of 0.76 μm-14 μm; wherein the imaging is performed before, during and/or after sealing of the container; wherein the imaging is performed during movement and/or transport of the container at a predetermined speed; and wherein the imaging is performed while moving the field of view of the camera in a same direction as the container, wherein the moving of the field of view is configured to reduce the velocity of the container relative to the imaging camera sufficiently to reduce smearing of images obtained from the imaging; and determining, based on at least one frame obtained from the imaging, a sealing efficiency of the container and/or contamination of the sealing region by the filling material.

According to some embodiments, the moving of the field of view increases an exposure time of the imaging camera to the container, thereby increasing a thermal radiation signal obtained.

According to some embodiments, moving the field of view of the camera comprises moving the imaging camera at a second predetermined speed. According to some embodiments, the second predetermined speed reduces the velocity of the container relative to the imaging camera sufficiently to reduce the smearing of the thermal images obtained from the imaging. According to some embodiments, the second predetermined speed is essentially equal to the predetermined speed of the container's movement/transport.

According to some embodiments, moving the field of view comprises moving and/or rotating an optical element, thereby shifting the field of view of the imaging camera in the same direction as the container. According to some embodiments, the optical element comprises an IR mirror. According to some embodiments, the IR mirror comprises a gold coated mirror. According to some embodiments, the imaging camera is static.

According to some embodiments, the imaging camera is moving at a second predetermined speed, wherein the combined movement of the imaging camera and the moving/rotating optical element reduces the relative velocity of the container relative to the imaging camera sufficiently to reduce the smearing of the thermal images obtained from the imaging.

According to some embodiments, the imaging is performed at an Infra-Red (IR) wavelength in the range of 8 μm-14 μm (LWIR); 3 μm-5.4 μm (MWIR); 1 μm-3 μm (SWIR); 0.9 μm-1.7 μm (NIR), or any combination thereof. According to some embodiments, the imaging is performed at an Infra-Red (IR) wavelength in the range of 8 μm-14 μm (LWIR) or 3 μm-5.4 μm (MWIR); or 1 μm-3 μm (SWIR). According to some embodiments, the imaging is performed at an Infra-Red (IR) wavelength in the range of 8 μm-14 μm (LWIR).

According to some embodiments, the imaging is performed after the sealing of the container has been completed.

According to some embodiments, the method further comprises cooling at least part of the container after its sealing, prior or during its imaging, thereby accelerating heat dissipation thereof and enabling active thermal dynamic imaging. According to some embodiments, the cooling of at least part of the container comprises applying conduction, convection or radiation on at least part of the container.

According to some embodiments, the predetermined speed of the container's movement/transport is in the range of 200 mm/sec-2000 mm/sec.

According to some embodiments, the container is selected from the group consisting of: a canister; a blister package, a tube, a heat seal bag, a pouch, a sachet, a bottle, or any combination thereof.

According to some embodiments, the method further comprises heating at least part of the container prior to the imaging thereof; thereby increasing an image contrast between the sealing region and the filling material. According to some embodiments, heating the sealing region comprises blowing hot air onto the sealing region. According to some embodiments, the heating of the sealing region is performed prior to, during, or after the filling of the container with filling material.

According to some embodiments, determining the sealing efficiency of the container and/or contamination of the sealing region by the filling material comprises determining contamination of the sealing region by material filling the container.

According to some embodiments, the method further comprises imaging at least the sealing region of the container at a wavelength in the range of 0.4 μm-0.76 μm (visual spectrum).

According to some embodiments, the method further comprises moving the field of view of the imaging camera so as to capture the entire container.

According to some embodiments, there is provided packaging system comprising: a package line comprising at least a sealing station for sealing of the container; an imaging camera operative at a wavelength in the range of 0.76 μm-14 μm and configured to image the container before, during and/or after sealing of the container; wherein the imaging camera is configured to image the container during the container's movement and/or transport at a predetermined speed; and wherein the imaging camera is configured to image the container while a field of view of the camera is moved in a same direction as the container, thereby reducing the relative velocity of the container relative to the imaging camera sufficiently to decrease smearing of thermal images obtained from the imaging; and a processor configured to determine a sealing efficiency of the container and/or contamination of the sealing region by the filling material, based on images obtained from said first imaging camera.

According to some embodiments, the packaging system further comprises a moving rail configured to move the imaging camera at a second predetermined speed. According to some embodiments, the second predetermined speed is essentially equal to the predetermined speed of the container's movement/transport.

According to some embodiments, the packaging system further comprises a mobile and/or rotating optical element configured to shift the field of view of the imaging camera in the same direction as the container. According to some embodiments, the optical element comprises an IR mirror. According to some embodiments, the IR mirror comprises a gold coated mirror. According to some embodiments, the camera is positioned at the sealing station thereof.

According to some embodiments, the imaging by the imaging camera is performed at an Infra-Red (IR) wavelength in the range of 8 µm-14 µm (LWIR); 3 µm-5.4 µm (MWIR); 1 µm-3 µm (SWIR); 0.9 µm-1.7 µm (NIR), or any combination thereof. According to some embodiments, the imaging by the imaging camera is performed at an Infra-Red (IR) wavelength in the range of 8 µm-14 µm (LWIR) or 3 µt-5.4 µm (MWIR); or 1 µm-3 µm (SWIR). According to some embodiments, the imaging by the imaging camera is performed at an Infra-Red (IR) wavelength in the range of 8 µum-14 µm (LWIR).

According to some embodiments, the predetermined speed of the container's movement/transport is in the range of 200 mm/sec-2000 mm/sec.

According to some embodiments, the packaging system further comprises a second camera, wherein the imaging by said second camera is performed at a wavelength in the range of 0.4 µm-0.76 µm (visual spectrum).

According to some embodiments, the packaging system further comprises a filling station for filling a container with a filling material.

According to some embodiments, the packaging system further comprises a cooling device configured to cool the sealed container thereby increasing the thermal dynamics of the obtained image.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

In addition to the exemplary aspects and embodiments described above, further aspects and embodiments will become apparent by reference to the figures and by study of the following detailed descriptions.

BRIEF DESCRIPTION OF THE FIGURES

Examples illustrative of embodiments are described below with reference to figures attached hereto. In the figures, identical structures, elements or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

DETAILED DESCRIPTION OF THE INVENTION

Figure 1:
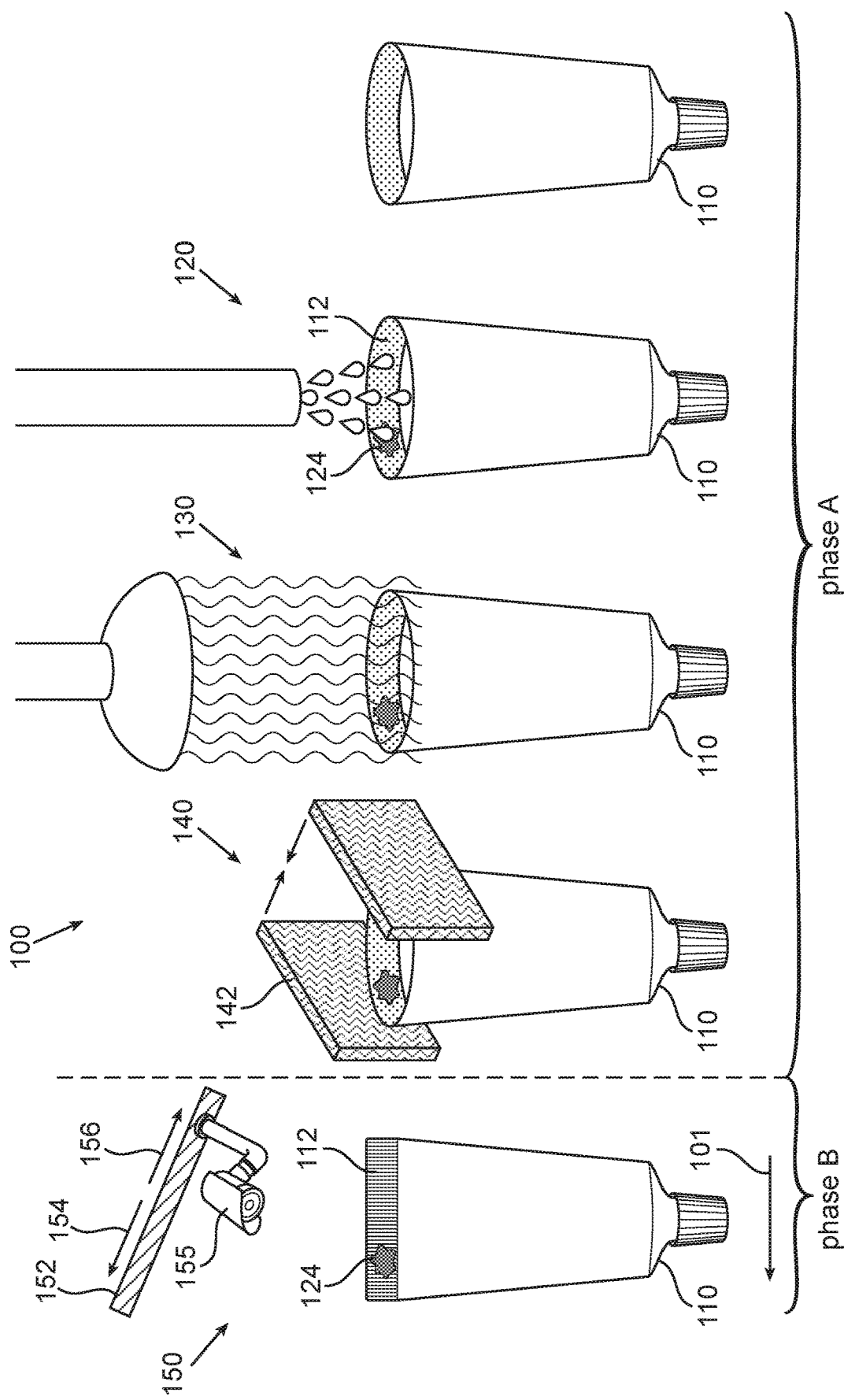
FIG. 1 schematically illustrates a process and system for monitoring sealing efficiency of a container and/or for identifying contamination of the sealing region by the filling material during its transport on a package line by applying thermographic imaging; wherein the thermographic camera is positioned on a moving rail configured to reduce the velocity of the container's movement relative to the camera; according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

According to some embodiments, there is provided a method for determining sealing integrity of a mobile object, the method comprising imaging at least a part of an object using at least one imaging camera; wherein the imaging is performed during movement and/or transport of the object at a predetermined speed; and determining, based on at least one frame obtained from the imaging, at least one parameter related to the quality of the object. The imaging is performed while moving the field of view of the camera in a same direction as the object, so as to reduce the velocity of the object relative to the imaging camera sufficiently to reduce smearing of the images obtained.

According to some embodiments, the object is container. As used herein the terms "container" and "package" may be used interchangeably and refer to any packaging means suitable for containing a filling material and sized and shaped to enable filling and sealing on a package line. According to some embodiments, the container may be a primary container, i.e. the package that first envelops the product and holds it. Non-limiting examples of suitable containers include canisters (such as, but not limited to, yogurt canisters, canisters containing cosmetic products, and the like), blister packages (such as, but not limited to, blisters used for packaging of medical equipment, medicaments, batteries, and more), tubes (such as, but not limited to, toothpaste tubes or cosmetic tubes), heat seal bags or sachets (such as, but not limited to, heat sealed bag used for food packing, for packing of medical equipment, and the like) or any combination thereof. Each possibility is a separate embodiment.

According to some embodiments, the imaging may be performed on at least part of a sealing region of a container and the at least one parameter related to the quality of the container may refer to a sealing efficiency of the container. As used herein, the term "sealing region" refers to part of the container, which, after filling of the package, is configured to ensure its sealing. According to some embodiments, sealing of the package is considered to be completed once opposite sides of the sealing region have been pressed together, after or while applying heat thereto. According to some embodiments, the sealing may be heat sealing.

According to some embodiments, the term "sealing efficiency" may refer to the integrity of the sealed container, i.e. its ability to prevent filling material contained therein to leak out. According to some embodiments, the sealing efficiency may be evaluated after the sealing of the container has been completed. Additionally or alternatively, the sealing of the container may be evaluated prior to and/or during the sealing of the container, in which case sealing efficiency is anticipated based on the presence/absence of contaminants on the containers sealing region. As used herein, the term "contamination" refers to spills/splashes of filling material or other material on at least the sealing region or part of the package; which impair the sealing of the package. According to some embodiments, the contamination may refer to uncleanness of the sealing region caused during the filling of the container with the filling material.

According to some embodiments, the object may be an object formed of welded parts. Non-limiting examples of objects formed of welded parts include heat-formed packages (e.g. plastic blisters), tubes including two or more tube elements welded together (e.g. breath sample tubes including filters and the like). According to some embodiments, the welding may include hot gas welding, laser welding and/or ultrasonic welding. Each possibility is a separate embodiment. According to some embodiments, the welding may include applying or melting adhesives or by melting the packaging material together using conduction, induction heating or ultrasonic welding methods. Each possibility is a separate embodiment.

According to some embodiments, determining at least one parameter related to the quality of the object may refer to at least one parameter related to the quality of the welding (e.g. the integrity).

As used herein, the term "filling material" refers to the product filled in/contained within the container. According to some embodiments, the filling material may be a liquid, a paste, a cream, a foam, or any combination thereof. Each possibility is a separate embodiment. According to some embodiments, the filling material may be colorless, transparent, white, cream-colored, light-pink colored or having a color similar to the color of at least the sealing region of the container. Each possibility is a separate embodiment.

According to some embodiments, movement and/or transport of the object may refer to passive and active change of the object's position. According to some embodiments, the movement and/or transport of the object (e.g. the container) may refer to the object being transported along a packaging line e.g. due to it being placed on a moving rail. According to some embodiments, the movement and/or transport of the object (e.g. the container) may refer to a sealed package exiting a heat sealing station of a packaging line. According to some embodiments, a "moving object" may refer to an object (e.g. container) moved at a predetermined speed, the speed causing the thermal imaging of the object to smear. According to some embodiments, the predetermined speed of the object (e.g. container) may be a speed too high to enable thermal relaxation of a thermal camera's bolometer. According to some embodiments, the predetermined speed of the object may be in the range of 200 mm/sec-2000 mm/sec.

As used herein, "moving a field of view of an imaging camera in a same direction as a moving object" may refer to moving the camera in the same direction as the object and/or manipulating an optical element such that the imaging camera's field of view shifts along with the movement of the object. Non-limiting examples of suitable optical elements include mirrors, prisms, beam splitters, lenses, or combinations thereof. Each possibility is a separate embodiment. According to some embodiments, the optical element is an IR mirror. According to some embodiments, the optical element is a gold covered mirror. According to some embodiments, moving of the field of view is configured to reduce the velocity of the object relative to the imaging camera. According to some embodiments, the shift in the field of view of the imaging camera (e.g. the movement of the camera along with the object) is configured to reduce the velocity of the object sufficiently to reduce smearing of the images (e.g. thermal images) obtained and/or sufficiently to increase the exposure time of the thermal camera to the sealed object, enabling dynamic thermal analysis of the heat-sealed region.

According to some embodiments, the method may further include moving a field of view of an imaging camera so as to capture an entire object. For example, when the field of view of the camera is too small to see the entire monitored object, the camera can be moved (e.g. from left to right) in smooth or step by step movements, in order to scan a larger part of or the entire object.

According to some embodiments, determining at least one parameter related to the quality of the object (e.g. sealing efficiency) includes processing of images obtained during the imaging. According to some embodiments, the imaging may include obtaining at least two images of the object. As used herein, the term "at least two", when referring to the images obtained during imaging may refer to 2, 3, 4, 5 or more images. Each possibility is a separate embodiment.

According to some embodiments, obtaining two or more images, e.g. in intervals may enable differentiating between signals caused by radiation from the sealing region and reflection caused by the packaging material itself. This is due to the fact that the radiation gradually decreases as the sealing region cools down whereas reflection stays intact. That is, according to some embodiments, the determining of at least one parameter related to the quality of the object may be based on an integrated analysis of the images, taking into account the cooling of the sealing region over time and the interval between the image frames taken.

According to some embodiments, image processing may include applying image processing algorithms. According to some embodiments, the image processing may include image contrast analysis, edge detection, image arithmetic, cross correlation between images, convolution between images or between an image to a predefined kernel, spatial frequency transformation and/or spatial filtering methods, temporal frequency transformation and temporal filtering methods, Fourier transforms, discrete Fourier transforms, discrete cosine transforms, morphological image processing, finding peaks and valleys (low and high intensity areas), image contours recognition, boundary tracing, line detection, texture analysis, histogram equalization, image deblurring, cluster analysis or any other suitable image processing known in the art, or combinations thereof. Each possibility is a separate embodiment. According to some embodiments, the identification of a low-quality object may result in halting further processing of the object. As a non-limiting example, identification of a container with improper sealing may results in its ejection from the packaging line, in arrest of the packaging process, or any other suitable action required to prevent an improperly sealed container from being discharged for distribution.

According to some embodiments, the method may further include identifying trends indicative of and/or responsible for the reduced quality of the object. For example, the method may include identifying trends indicative of an inefficient filling and/or sealing of the container, such as, but not limited to, inaccurate nozzle position, speed of packing line movement, heat of filing material, viscosity, press operation, and the like. According to some embodiments, the identifying of trends may include big-data analysis and/or machine learning techniques. According to some embodiments, when a defective trend is identified, the packaging line may be halted for inspection, calibration, and/or the like, thereby preventing defective sealing in multiple containers.

According to some embodiments, the imaging may be performed prior to filling, during filling, after filling, prior to sealing, during sealing, after sealing, or any combination thereof. Each possibility is a separate embodiment. According to some embodiments, the imaging may at least be performed immediately after completion of the sealing of the container. According to some embodiments, the imaging may be performed using one or more cameras, such as one, two, three, four or more cameras. Each possibility is a separate embodiment. As a non-limiting example, a first camera may be used for imaging the filling of the container and a second camera for the imaging of the sealing of the container.

According to some embodiments, the imaging may be infra-red (IR) imaging. According to some embodiments, the imaging may be thermal imaging. According to some embodiments, the imaging may be MWIR imaging. According to some embodiments, the imaging may be LWIR imaging. According to some embodiments, the imaging is performed at a wavelength in the range of 0.76 µm-14 µm. According to some embodiments, the IR imaging may be short wave-imaging, medium wave imaging, long wave imaging, or combinations thereof. Each possibility is a separate embodiment. As a non-limiting example, the imaging may include obtaining images (one or more) in the short-wave spectrum, images (one or more) in the medium wave spectrum and/or images (one or more) in the long wave spectrum (one or more) of the same container. According to some embodiments, the IR imaging may be performed at a wavelength in the range of 8 µm-14 µm; 3 µm-5.4 µm; 1 µm-3 µm; 0.9 µm-1.7 µm, or any combination thereof. Each possibility is a separate embodiment. As a non-limiting example, the imaging of a container may include obtaining frames in each of or some of the aforementioned wavelength ranges. According to some embodiments, the imaging may be performed utilizing a Vanadium Oxide, VOx bolometer uncooled IR camera.

According to some embodiments, the imaging may be UV imaging. According to some embodiments, the imaging may be performed at a wavelength in the range of 0.01 µm-0.4 µm. According to some embodiments, the UV imaging may be done instead of or in combination with the IR imaging.

According to some embodiments, the imaging may be visible light imaging. According to some embodiments, the imaging may be performed at a wavelength in the range of 0.4 µm-0.76 µm. According to some embodiments, the visible light imaging may be done in combination with the IR imaging and/or UV imaging. For example, the visible imaging may be used in combination with IR imaging, enabling detection of contamination based on both thermal changes and changes in color. According to some embodiments, the imaging may be performed utilizing CCD based cameras.

According to some embodiments, the method may include heating at least the sealing region of the container prior to the imaging thereof; thereby increasing an image contrast between the sealing region and the filling material. According to some embodiments, heating the container comprises heating the container to a temperature above 30° C., above 35° C., above 40° C., or above 50° C. Each possibility is a separate embodiment. According to some embodiments, the heating of the sealing region comprises blowing hot air onto the sealing region, into the container and/or on the outside of the container. According to some embodiments, the heating of the sealing region may be done prior to, during, or after the filling of the container with the filling material. Each possibility is a separate embodiment.

According to some embodiments, the method may include cooling at least the sealing region of the container prior to the imaging thereof; thereby increasing an image contrast between the sealing region and the filling material. According to some embodiments, cooling the container comprises cooling the container to a temperature below 20° C., below 15° C., below 10° C., or below 5° C. Each possibility is a separate embodiment. According to some embodiments, the cooling of the container may include blowing cool air onto the sealing region, into the container and/or on the outside of the container. According to some embodiments, the cooling of the container may include applying conduction, convection or radiation on at least part of the container According to some embodiments, the cooling of the sealing region may be done prior to, during, or after the filling of the container with the filling material. Each possibility is a separate embodiment.

According to some embodiments, the method may include heating or cooling the filling material prior to the imaging; thereby increasing an image contrast between the sealing region and the filling material. According to some embodiments, heating the filling material comprises heating the filling material to a temperature above 30° C., above 35° C., above 40° C., or above 50° C. Each possibility is a separate embodiment. According to some embodiments, cooling the filling material comprises cooling the filling material to a temperature below 20° C., below 15° C., below 10° C., or below 5° C. Each possibility is a separate embodiment. According to some embodiments, the heating or cooling of the filling material may be done prior to, during or after the filling of the container with the filling material. Each possibility is a separate embodiment.

According to some embodiments, the method may include illuminating at least the sealing region of the container before, during, or after the filling of the container and/or before, during, or after the sealing of the container; thereby increasing an image contrast between the sealing region and the filling material. Each possibility is a separate embodiment. According to some embodiments, the illumination may be IR illumination, visible light illumination, UV illumination, micro wave radiation, or combinations thereof. Each possibility is a separate embodiment.

According to some embodiments, the method further includes evaluating sealing integrity, based on an integrated analysis of pre-sealing and post-sealing imaging. As used herein, the term "integrated analysis" may refer to image processing, including applying processing algorithms to pre-sealing and post-sealing images and identifying improper sealing based on image parameters deduced from at least one pre-sealing image and at least one post-sealing image.

Cooling the sealing region (e.g. by blowing cold air on the sealing region after the heat-sealing phase) might increase the gradient in the thermal image, thus intensifying sealing defects.

According to some embodiments, the method further includes squeezing or otherwise applying pressure on the container, prior to the post-sealing imaging. Squeezing the container will, in the case of incomplete sealing, result in small amounts of filler material to leak out of the container. Advantageously, thermal imaging of the container allows the detection of such leaks, and thus improper sealing of the container due to its high sensitivity to differences in the emissivity of a product and its low sensitivity to reflections. Specifically, thermal infra-red imaging (e.g. utilizing a Vanadium Oxide, VOx bolometer uncooled IR camera), is primarily based on radiation (as compared to reflection) and is therefore sensitive to differences in emissivity. As a result, its sensitivity to leakages is much higher than standard visual imaging (e.g. utilizing CCD based cameras).

According to some embodiments, the imaging includes taking images at at least two different angles. This may eliminate patterns in the image caused by reflection from the surrounding (which change as a function of the viewing angle) and to focus on patterns in the image caused by the heat sealing or filling process (which is essentially unchanged at different angles of view). According to some embodiments, taking images at two or more different angles include: moving the imaging camera during imaging to obtain images from different angles of view, applying more than one imaging camera, each camera capturing the object from a different angle of view, utilizing optical elements enabling imaging at different angles of view, or any other suitable way of changing the imaging angle, or combinations thereof.

According to some embodiments, there is provided a method for determining welding efficiency of an object formed of welded parts, the method comprising imaging of at least a part of the welding region of the object using at least one imaging camera, as essentially described herein; and determining, based on at least one frame obtained from the imaging, at least one parameter related to the welding efficiency of the object. According to some embodiments, the imaging is performed during movement and/or transport of the object at a predetermined speed, as essentially described herein. According to some embodiments, imaging is performed while moving the field of view of the camera in a same direction as the object so as to reduce the velocity of the object relative to the imaging camera sufficiently to reduce smearing of the images obtained, as essentially described herein. Non-limiting examples of objects formed of welded parts include heat-formed packages (e.g. plastic blisters), tubes, including two or more tube elements welded together (e.g. breath sample tubes including filters and the like). According to some embodiments, the welding may include hot gas welding, laser welding, and/or ultrasonic welding. Each possibility is a separate embodiment. According to some embodiments, the welding may include applying or melting adhesives or by melting the packaging material together using conduction, induction heating or ultrasonic welding methods. Each possibility is a separate embodiment. According to some embodiments, determining at least one parameter related to the quality of the object may refer to at least one parameter related to the quality of the welding (e.g. the integrity).

According to some embodiments, there is provided a method for determining sealing efficiency and/or for identifying contamination of the sealing region by the filling material of large volume objects and/or moving objects, the method comprising positioning an imaging camera at a distance from the object encompassing its entire volume within a field of view of the camera; imaging the object using said imaging camera; applying processing algorithms configured to compensate for a reduced image resolution caused by the distance of said imaging camera from said object; and determining, based on said processing, at least one parameter related to the sealing efficiency of the object. Advantageously, the method enables increasing the sealing capacity of a package line. For example, the method enables concurrent sealing of a plurality of containers (e.g. 8 yogurt cups at a time) as well as determining the sealing efficiency of the plurality of containers. As used herein, the term plurality of containers, when referring to concurrent sealing and sealing evaluation of containers, may refer to 2, 3, 4, 5, 6, 8, 10, 20 or more containers. Each possibility is a separate embodiment. Additionally or alternatively, the method allows evaluating the sealing efficiency of moving objects.

According to some embodiments, there is provided a method for determining sealing efficiency and/or for identifying contamination of the sealing region by the filling material of large volume objects and/or moving objects; imaging the object using a high sensitive camera; and determining, based on one or more frames obtained from said imaging, at least one parameter related to the sealing efficiency of the object. Advantageously, the method enables increasing the sealing capacity of a package line. For example, the method enables concurrent sealing of a plurality of containers (e.g. 8 yogurt cups at a time) as well as determining the sealing efficiency of the plurality of containers. As used herein the term plurality of containers, when referring to concurrent sealing and sealing evaluation of containers, may refer to 2, 3, 4, 5, 6, 8, 10, 20 or more containers. Each possibility is a separate embodiment. According to some embodiments, the high sensitive camera may be a camera having a 640×512 resolution with a pixel size of 17 micron. According to some embodiments a regular sensitive camera as used herein, may refer to an imaging camera having a 320×256 resolution with a pixel size of 25 micron. Additionally or alternatively, the method allows evaluating the sealing efficiency and/or identifying contamination of the sealing region by the filling material of moving objects.

According to some embodiments, there is provided a method for determining sealing efficiency and/or for identifying contamination of the sealing region by the filling material of large volume objects and/or moving objects, the method comprising imaging a part of the object captured by a first field of view of an imaging camera; moving the imaging camera and/or the object to obtain a second field of view enabling imaging of a second part of the object; and determining, based on an integrated analysis of image frames obtained at least from said first and second field of views, at least one parameter related to the sealing efficiency of the (entire) object. According to some embodiments, the method may include capturing images of the object at a plurality of fields of view, e.g. 3, 4, 5 or more field of views, and determining the sealing efficiency of the object based on an integrated analysis of image frames obtained from each of (or part of) the field of views. Advantageously, the method enables increasing the sealing capacity of a package line. For example, the method enables concurrent sealing of a plurality of containers (e.g. 8 yogurt cups at a time) as well as determining the sealing efficiency of the plurality of containers. As used herein the term plurality of containers, when referring to concurrent sealing and sealing evaluation of containers, may refer to 2, 3, 4, 5, 6, 8, 10, 20 or more containers. Each possibility is a separate embodiment. Additionally or alternatively, the method allows evaluating the sealing efficiency of moving objects.

According to some embodiments, there is provided a method for determining sealing efficiency and/or for identifying contamination of the sealing region by the filling material of large volume objects and/or moving objects, the method comprising imaging a first part of the object using a first imaging camera; imaging a second part of the object using a second imaging camera; and determining, based on an integrated analysis of image frames obtained from said first and second imaging camera, at least one parameter related to the sealing efficiency of the object. According to some embodiments, the first and second imaging camera may be configured to image the object essentially simultaneously. According to some embodiments, the method may include capturing images of the object at a plurality of fields of view, e.g. 3, 4, 5 or more field of views, and determining the sealing efficiency of the object based on an integrated analysis of image frames obtained from each of (or part of) the field of views. Advantageously, the method enables increasing the sealing capacity of a package line. For example, the method enables concurrent sealing of a plurality of containers (e.g. 8 yogurt cups at a time) as well as determining the sealing efficiency of the plurality of containers. As used herein the term plurality of containers, when referring to concurrent sealing and sealing evaluation of containers, may refer to 2, 3, 4, 5, 6, 8, 10, 20 or more containers. Each possibility is a separate embodiment. Additionally or alternatively, the method allows evaluating the sealing efficiency of moving objects.

According to some embodiments, there is provided a method for determining sealing efficiency and/or for identifying contamination of the sealing region by the filling material of large volume objects and/or moving objects, the method comprising imaging a first part of the object using an imaging camera having a first field of view; changing the field of view of the camera by applying an optical element imaging, imaging the object in the changed field of view; and determining, based on an integrated analysis of image frames obtained from the first and changed field of view, at least one parameter related to the sealing efficiency of the object. According to some embodiments, non-limiting examples of suitable optical elements include mirrors, reflective surfaces, prisms, lenses, and the like. Each possibility is a separate embodiment. According to some embodiments, the method may include capturing images of the object at a plurality of fields of view, e.g. 3, 4, 5 or more field of views, for example, by using a plurality of optical elements, and determining the sealing efficiency of the object based on an integrated analysis of image frames obtained from each of (or part of) the fields of view. Advantageously, the method enables increasing the sealing capacity of a package line. For example, the method enables concurrent sealing of a plurality of containers (e.g. 8 yogurt cups at a time) as well as determining the sealing efficiency of the plurality of containers. As used herein the term plurality of containers, when referring to concurrent sealing and sealing evaluation of containers, may refer to 2, 3, 4, 5, 6, 8, 10, 20 or more containers. Each possibility is a separate embodiment. Additionally or alternatively, the method allows evaluating the sealing efficiency of moving objects.

According to some embodiments, there is provided a system comprising a transport line comprising at least one processing station configured to process an object and an imaging camera configured to image the object during its movement and/or transport at or above a predetermined speed; and a processor configured to determine at least one parameter related to the quality of the object, based on images obtained from the imaging camera. The imaging camera may be operative at a wavelength in the range of 0.01 µm-14 µm, at a range of 0.76 µm-14 µm, at a range of 3 µm-14 µm, at a range of 8 µm-14 µm, or any other suitable range. Each possibility is a separate embodiment. According to some embodiments, the imaging camera may be operative in a range within the thermal IR spectrum. According to some embodiments, the camera is positioned and configured to enable imaging of at least a part of the object before, during and/or after processing thereof. According to some embodiments, the imaging camera is configured to image the object, while a field of view of the camera is moved in a same direction as the object, thereby reducing the relative velocity of the object relative to the imaging camera sufficiently to decrease smearing of thermal images obtained from the imaging.

According to some embodiments, the system may be a packaging system, and the transport line may be a packaging line. According to some embodiments, the object may be a container as essentially described herein. As used herein, the terms "packaging line" and "package line" may be used interchangeably and refer to an automatic process of enclosing products within containers or any kind of packages. According to some embodiments, the term refers to automated enclosing of products within heat-sealed containers.

According to some embodiments, the package line includes at least a sealing station. According to some embodiments, the package line further includes a filling station. As used herein the term "filling station" refers to part of the packaging line where the filling material is poured into, sprayed into or otherwise dispensed into the container. As used herein, the term "sealing station" refers to part of the packaging line where the container holding the filling material is hermetically sealed by pressing together the shores of the container's sealing region after or during a heating phase. According to some embodiments, a packaging line further includes a heating station, located prior to the sealing station. As used herein the term "heating station" refers to part of the packaging line where the sealing region is heated in preparation for sealing. According to some embodiments, the sealing further includes applying an adhesive to the shores prior to the shores being pressed together. According to some embodiments, a packaging line further includes a discharge station. As used herein the term "discharge station" refers to part of the packaging line where the sealed container is forwarded for further processing, such as, but not limited, to secondary packaging.

According to some embodiments, the at least one parameter related to the quality of the processed object may refer to the sealing efficiency of the container, as essentially described herein.

According to some embodiments, the camera is positioned at the filling station of the process line. According to some embodiments, the camera is positioned at the heating station of the process line. According to some embodiments, the camera is positioned at the sealing station of the process line.

According to some embodiments, the packaging system includes a moving rail configured to move the imaging camera at a second predetermined speed in a same direction as the container. As used herein, the term "moving rail" may refer to any element configured to move an imaging camera or other optical element in the direction of the object imaged. As a result, the field of view of the camera is moved along with the movement of the container, thereby reducing the relative velocity of the container relative to the imaging camera.

According to some embodiments, the speed of movement of the moving rail, and thus of the camera, is sufficient to decrease smearing of thermal images taken. According to some embodiments, the speed of movement of the moving rail, and thus of the camera, is essentially equal to the predetermined speed of the container's movement/transport. According to some embodiments, the predetermined speed of the container's movement/transport is in the range of 200 mm/sec-2000 mm/sec. According to some embodiments, the speed of movement of the moving rail is in the range of 200 mm/sec-2000 mm/sec.

According to some embodiments, the packaging system includes a mobile and/or rotating optical element configured to shift the field of view of the imaging camera in the same direction as the container. The optical element may be any element configured to allow an imaging camera's field of view to change along with the movement of the object imaged. According to some embodiments, the optical element may allow the field of view of the camera to shift, while the camera itself is held static. Alternatively, the optical element may allow the field of view of the camera to shift in conjunction with the movement of the camera, such that the combined operation of the camera and the optical element allows the field of view of the imaging camera to move along with the object imaged. Non-limiting examples of suitable optical elements include mirrors, prisms, beam splitters, lenses, or combinations thereof. Each possibility is a separate embodiment. According to some embodiments, the optical element is an IR mirror. According to some embodiments, the optical element is a gold covered mirror.

According to some embodiments, the camera is an IR camera (e.g. NIR, SWIR) and/or IR thermographic (thermal imaging) camera (e.g. MWIR, LWIR) configured to enable IR imaging as essentially described herein. According to some embodiments, the imaging camera may be a thermographic camera. According to some embodiments, the imaging camera may be configured to operate at a wavelength in the range of 0.76 µm-14 µm. According to some embodiments, the imaging may be performed at a wavelength in the range of 8 µm-14 µm; 3 µm-5.4 µm; 1 µm-3 µm; 0.9 µm-1.7 µm, or any combination thereof. Each possibility is a separate embodiment. For example, the imaging may include obtaining frames in each of or some of the aforementioned wavelength ranges, as essentially described herein.

According to some embodiments, the imaging may be performed utilizing a Vanadium Oxide, VOx bolometer uncooled IR camera. Additionally or alternatively, the camera may enable imaging the visible and/or UV spectrum, as essentially described herein.

According to some embodiments, the processor unit may be an integral part of the packaging line. According to some embodiments, the processor may be an external and/or adjunct computing device, such as, but not limited to, a mobile, smartphone, tablet, pc or any dedicated computing device. Each possibility is a separate embodiment. According to some embodiments, the processor may be a virtual processor, such as an internet enabled device (i.e. cloud computing). According to some embodiments, the processor may be configured to identify contamination of the sealing region by performing image processing, e.g. applying image processing algorithms, on the images obtained from the camera, as essentially described herein.

According to some embodiments, the packaging system comprises a second camera (inline or offline) operative at a wavelength in the range of 0.01 µm-14 µm; wherein the second camera is positioned and configured to enable imaging of at least the sealing region of the container after the sealing of the container has been completed. According to some embodiments, the second camera may be positioned at the filling station, the heating station, the sealing station or discharge station of the package line. Each possibility is a separate embodiment. According to some embodiments, the second imaging camera may be a thermographic camera. According to some embodiments, the second imaging camera may be configured to operate at a wavelength in the range of 0.76 µm-14 µm. According to some embodiments, the imaging by the second camera may be performed at a wavelength in the range of 8 µm-14 µm; 3 µm-5.4 µm; 1 µm-3 µm; 0.9 µm-1.7 µm, or any combination thereof. Each possibility is a separate embodiment. For example, the imaging may include obtaining frames in each of or some of the aforementioned wavelength ranges, as essentially described herein.

According to some embodiments, the packaging line may include more than two cameras, such as 3, 4, 5 or more cameras. These cameras may be distributed along the stations of the packaging line (e.g. one at each station). According to some embodiments, a particular station may include more than one camera; while other stations may include one only or be devoid of cameras.

According to some embodiments, the processor may be further configured to identify improper sealing, based on an integrated analysis of images obtained from more than one camera. According to some embodiments, the integrated analysis may include applying processing algorithms to images obtained from the more than one cameras and identifying improper sealing based on image parameters deduced/extrapolated from at least one image obtained from each of the cameras.

According to some embodiments, the packaging line further comprises a "quality control (QC) station" at which the container is squeezed or otherwise has pressure applied thereon, as essentially described herein. According to some embodiments, the QC station is positioned after the sealing station, but prior to the second camera.

Reference is now made to FIG. 1, which schematically illustrates a packaging line 100 for monitoring sealing efficiency and/or for identifying contamination of the sealing region by the filling material of a moving container, here illustrated as tube 110, using thermographic imaging (thermal imaging). Packaging line 100 includes a pre-sealing phase, indicated as phase A and a post-sealing phase, indicated as phase B. Phase A includes a filling station 120, a heating station 130, and a sealing station 140 including pressing plates 142. Phase B includes a discharge station 150, where tube 110, now hermetically sealed, can be forwarded for further processing. Packaging line 100 includes a thermal imaging IR camera 155 positioned on a moving rail 152 at discharge station 150. Alternatively, thermal imaging IR camera 155 may configured to move on rail 152. The imaging by thermal imaging IR camera 155 is preferably performed at a wavelength in the range of 8 µm-14 µm, and is configured to image a sealing region 112 of tube 110 after sealing has been completed and during movement of tube 110 along discharge station 150, as illustrated by arrows 101. During imaging of tube 110, thermal imaging IR camera 155 moves on a moving rail 152 in the same direction as tube 110, as illustrated by arrow 154. As a result, the velocity of tube 110 relative to thermal imaging IR camera 155 is reduced, thereby lessening smearing of the thermal images taken by thermal imaging IR camera 155. Once tube 110 exits discharge station 150, moving rail 152 returns to its starting point, as illustrated by arrow 156, prior to commencing imaging of a next tube (not shown). Packaging line 100 further includes a processor (not shown) configured to obtain one or more image frames from thermal imaging IR camera 155, to process the images and to identify contaminations, such as contamination 124 on sealing region 112 of tube 110 and/or to identify improper sealing of tube 110. The evaluation of the sealing integrity of tube 110 is sensitive and reliable, since noise resulting from image smearing has been largely avoided. According to some embodiments, once an improperly sealed tube is identified, it may be ejected from discharge station 150 such that further processing and/or distribution is prevented.

Figure 2:
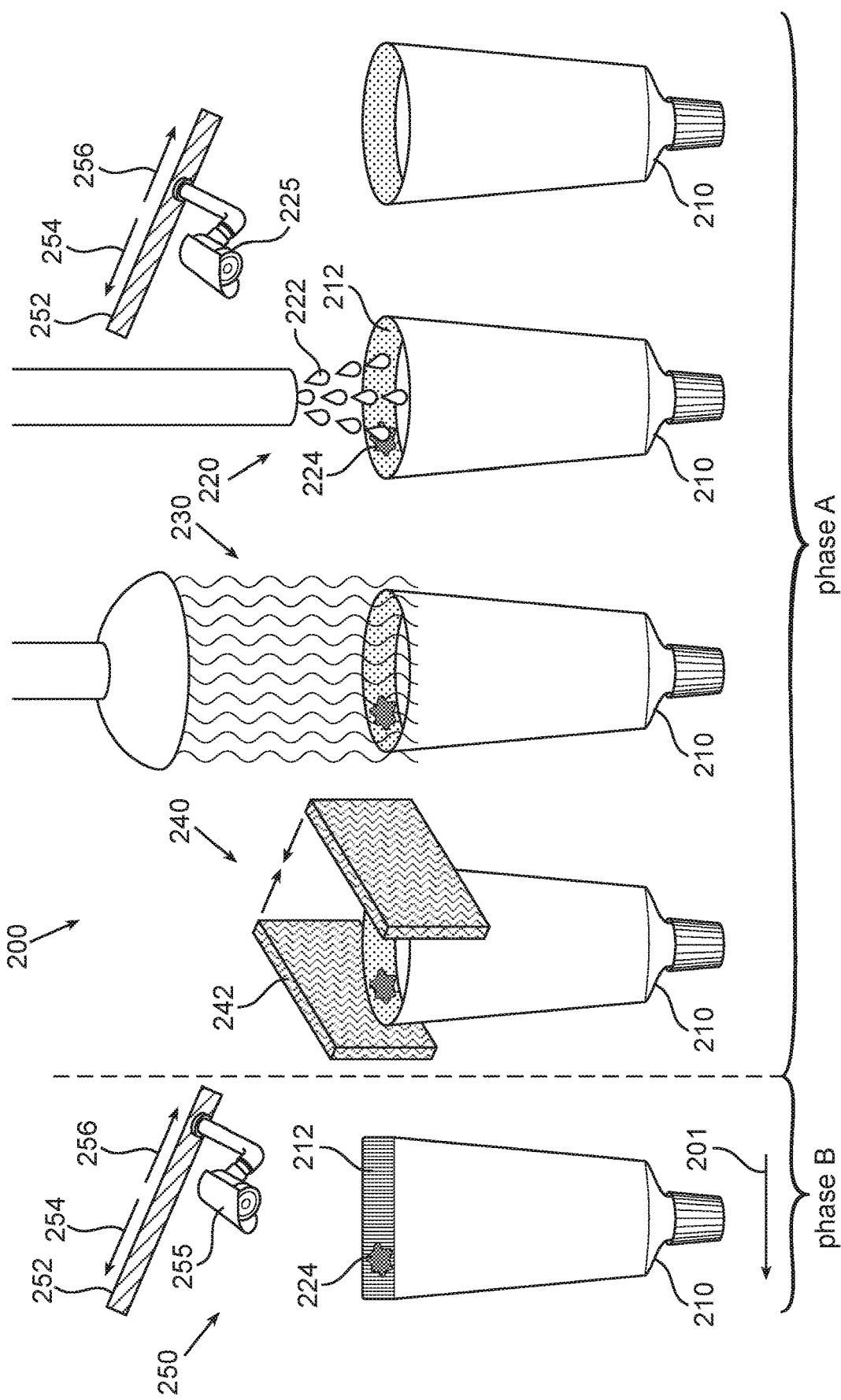
FIG. 2 schematically illustrates a process and system for monitoring sealing efficiency and/or contamination of a sealing region of a container during its transport on a package line by applying thermographic imaging; wherein the system includes a first thermographic camera positioned on a moving rail at the filling station and a second thermographic camera positioned on a moving rail after the sealing station of the packaging process; wherein the second thermographic camera is positioned on a moving rail configured to reduce the velocity of the container's movement relative to the camera; according to some embodiments.

Reference is now made to FIG. 2, which schematically illustrates a packaging line 200 for monitoring sealing efficiency and/or for identifying contamination of the sealing region by the filling material of a moving container, here illustrated as tube 210, using thermographic imaging (thermal imaging). Packaging line 200 includes a pre-sealing phase, indicated as phase A and a post-sealing phase, indicated as phase B. Phase A includes a filling station 220, a heating station 230, and a sealing station 240 including pressing plates 242. Phase B includes a discharge station 250, where tube 210, now hermetically sealed, can be forwarded for further processing. Packaging line 200 includes a thermal imaging camera 225 positioned at filling station 220 and configured to image a sealing region 212 of tube 210 during filling of tube 200 with filling material 222. According to some embodiments, thermal imaging camera 225 may be positioned on a moving rail 252 or be configured to move on rail 252. The imaging by thermal imaging IR camera 225 may be performed in a wavelength in the range of 0.1 µm-14 µm, preferably in the range of 8 µm-14 µm. During imaging of tube 210, thermal imaging IR camera 225 may move on a moving rail 252 in the same direction as tube 210, as illustrated by arrow 254. As a result, the velocity of tube 210 relative to thermal imaging IR camera 225 is reduced, thereby lessening smearing of the thermal images taken by thermal imaging IR camera 225. Once tube 210 exits discharge station 250, moving rail 252 returns to its starting point, as illustrated by arrow 256, prior to commencing imaging of a next tube (not shown). Packaging line 200 also includes a thermal imaging IR camera 255 positioned on a moving rail 252 at discharge station 250. The imaging by thermal imaging IR camera 255 is preferably performed at a wavelength in the range of 8 µm-14 µm, and is configured to image a sealing region 212 of tube 210 after sealing has been completed and during movement of tube 210 along discharge station 250, as illustrated by arrows 201. During imaging of tube 210, thermal imaging IR camera 255 moves on a moving rail 252 in the same direction as tube 210, as illustrated by arrow 254. As a result, the velocity of tube 210 relative to thermal imaging IR camera 255 is reduced, thereby lessening smearing of the thermal images taken by thermal imaging IR camera 255. Once tube 210 exits discharge station 250, moving rail 252 returns to its starting point, as illustrated by arrow 256, prior to commencing imaging of a next tube (not shown). Packaging line 200 further includes a processor (not shown) configured to obtain one or more image frames from thermal imaging IR camera 255, to process the images and to identify contaminations, such as contamination 224 on sealing region 212 of tube 210 and/or to identify improper sealing of tube 210. The evaluation of the sealing integrity of tube 210 is sensitive and reliable, since noise resulting from image smearing has been largely avoided. According to some embodiments, one or more image frames obtained from camera 225 and from thermal imaging IR camera 255 may be processed in conjunction. This may enable thereby further increasing the sensitivity and the reliability of the sealing efficiency evaluation. According to some embodiments, once an improperly sealed tube is identified, it may be ejected from discharge station 250 such that further processing and/or distribution is prevented.

Figure 3:
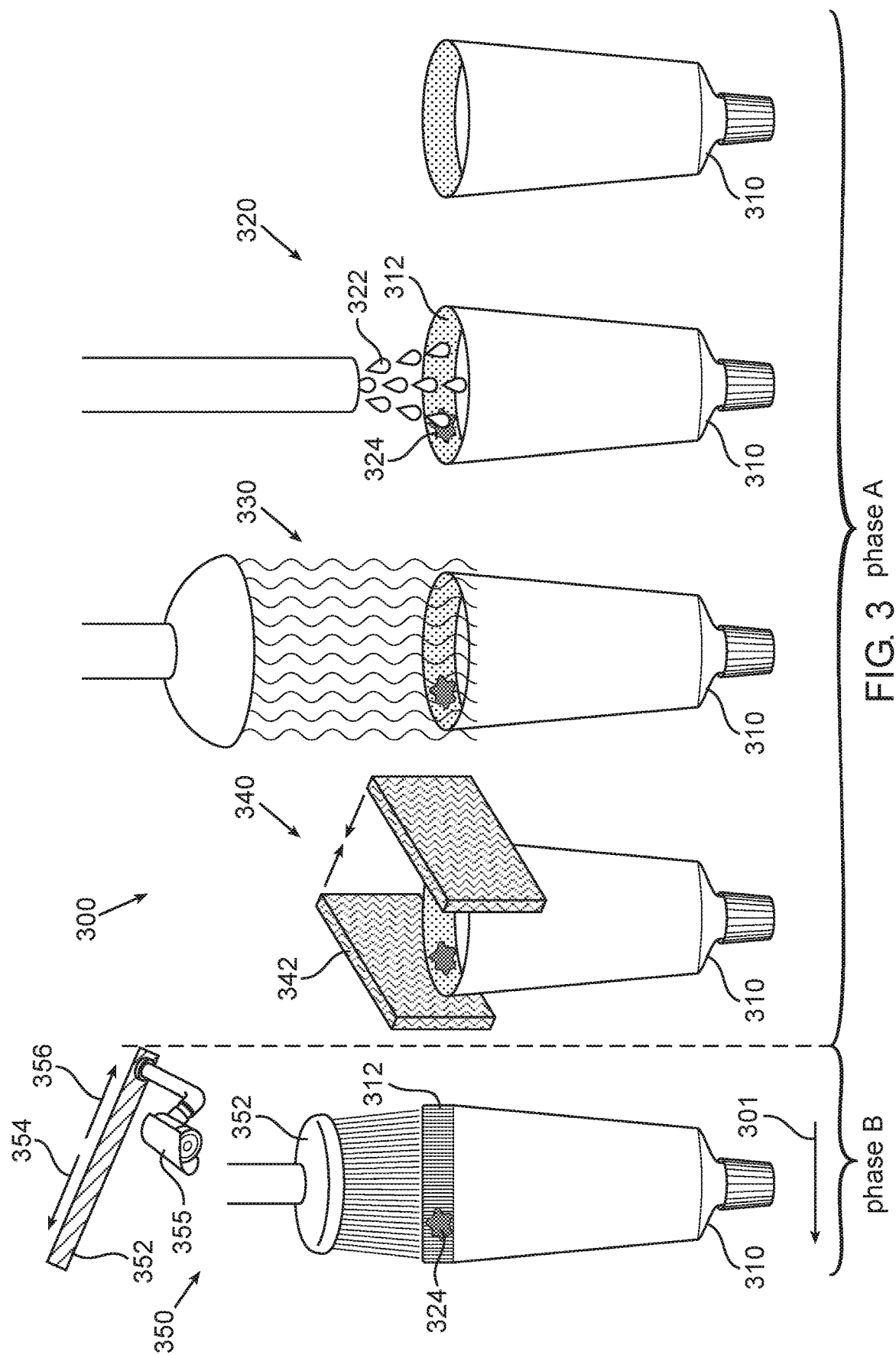
FIG. 3 schematically illustrates a process and system for monitoring sealing efficiency and/or for identifying contamination of the sealing region by the filling material of a container during its transport on a package line by applying thermographic imaging; wherein the thermographic camera is positioned on a moving rail configured to reduce the velocity of the container's movement relative to the camera; and wherein the package line further includes a cool air blower configured for cooling of the container prior to imaging; according to some embodiments.

Reference is now made to FIG. 3, which schematically illustrates a packaging line 300 for monitoring sealing efficiency and/or for identifying contamination of the sealing region by the filling material of a moving container, here illustrated as tube 310, using thermographic imaging (thermal imaging). Packaging line 300 includes a pre-sealing phase, indicated as phase A and a post-sealing phase, indicated as phase B. Phase A includes a filling station 320, a heating station 330, and a sealing station 340 including pressing plates 342. Phase B includes a quality control (QC) station 350, where tube 310, now hermetically sealed, is cooled e.g. by blowing cool air using blower 352. The cooling of sealed tube 310 increases the thermal gradient of properly and improperly sealed regions, and thus enables sensitive sealing efficiency evaluation. Packaging line 300 includes a thermal imaging IR camera 355 positioned at QC station 350. According to some embodiments, thermal imaging camera 355 may be positioned on a moving rail 352 or be configured to move on rail 352. The imaging by thermal imaging IR camera 355 is preferably performed at a wavelength in the range of 8 µm-14 µm, and is configured to image a sealing region 312 of tube 310 after sealing has been completed, and during and/or after cooling of tube 310. During imaging of tube 310, thermal imaging IR camera 355 may move on a moving rail 352 in the same direction as tube 310, as illustrated by arrow 354. As a result, the velocity of tube 310 relative to thermal imaging IR camera 355 is reduced, thereby lessening smearing of the thermal images taken by thermal imaging IR camera 355. Once tube 310 exits discharge station 350, moving rail 352 returns to its starting point, as illustrated by arrow 356, prior to commencing imaging of a next tube (not shown). Packaging line 300 further includes a processor (not shown) configured to obtain one or more image frames from thermal imaging IR camera 355, to process the images and to identify contaminations, such as contamination 324 on sealing region 312 of tube 310 and/or to determine the sealing efficiency of tube 310. The evaluation of the sealing efficiency of tube 310 is sensitive and reliable, due to the improved gradient obtained by the cooling of tube 310. This is of particular importance when the heat capacity of sealing region 312 is too high to identify contaminations. According to some embodiments, once an improperly sealed tube is identified, it may be ejected from discharge station 350 such that further processing and/or distribution is prevented.

EXAMPLES

Example 1—Comparative Study of Imaging of Moving Containers

Figure 4A:
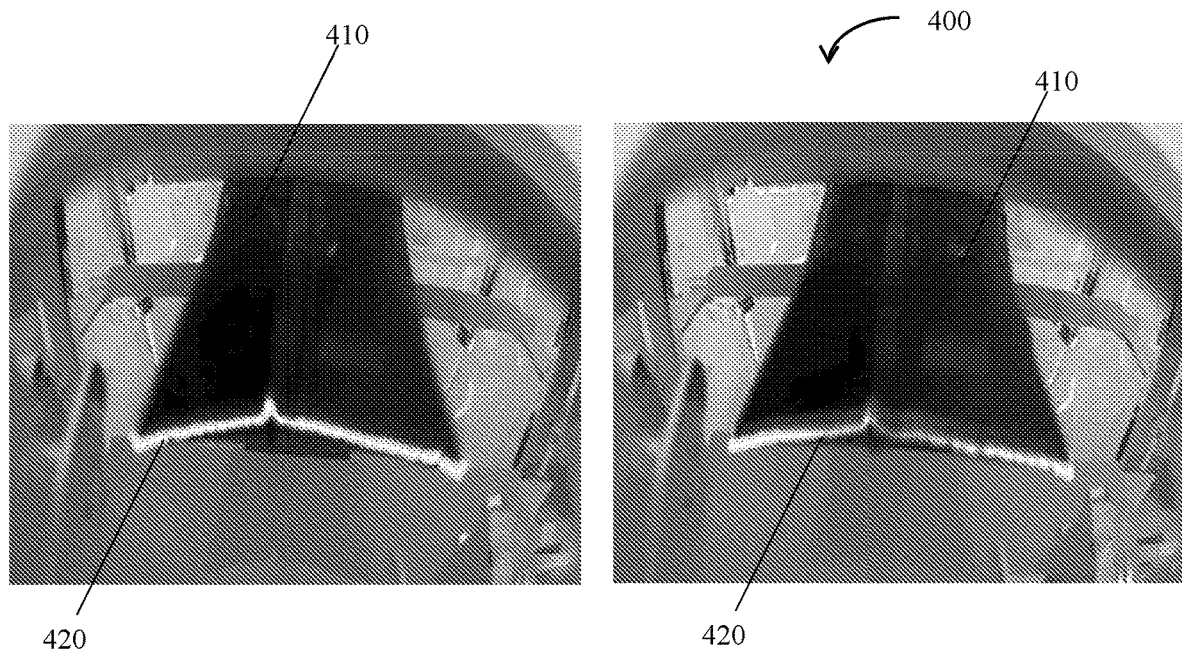
FIG. 4A shows illustrative 2D thermal images of a horizontal sealing line of a milk bag transported on a packaging line (white=hot, black=cold). The right panel shows an image obtained when the velocity of the milk bag is larger than the velocity of the thermal imaging camera (bag is moving, camera is still). The left panel shows an image obtained when the velocity of the milk bag is the same as the velocity of the thermal imaging camera.
Figure 4B:
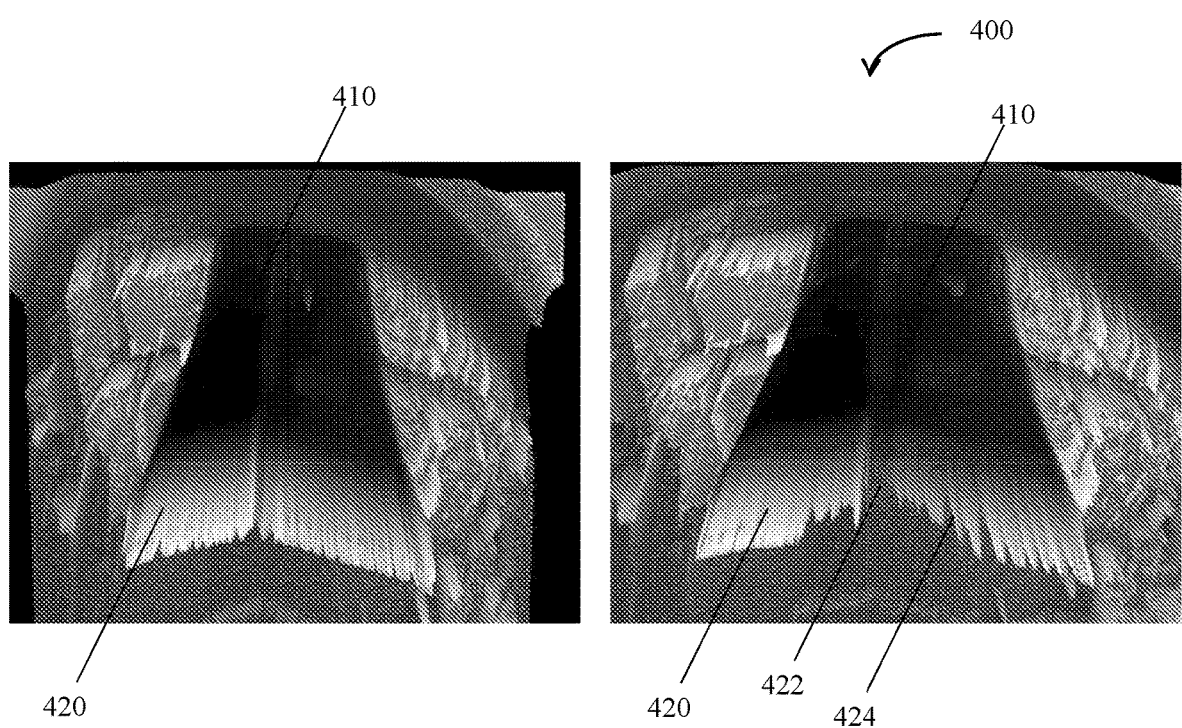
FIG. 4B shows illustrative 3D thermal images of a horizontal sealing line of a milk bag transported on a packaging line (white, high=hot, black, low=cold). The right panel shows an image obtained when the velocity of the milk bag is larger than the velocity of the thermal imaging camera (bag is moving, camera is still). The left panel shows an image obtained when the velocity of the milk bag is the same as the velocity of the thermal imaging camera.

FIG. 4A and FIG. 4B are illustrative images 400 obtained when 2D and 3D imaging, respectively, of the horizontal sealing line 420 of a milk bag 420 being transported on a conveyor belt (white and high=hot, black and low=cold). Horizontal sealing line 420 of milk bag 420 is the last sealing made after filling of the container with milk and is therefore the sealing most frequently impaired.

As seen from the left panel of FIG. 4A and FIG. 4B, when the velocity of milk bag 410 is larger than the velocity of the thermal imaging camera (bag is moving, camera is still), the image becomes blurred and, as best seen from the 3D image of FIG. 4B, the blurring causes dips, such as dips 422 and 424 in the sealing lines which dips gives the false impression that sealing line 420 is impaired. Based on this imaging, milk bag would be discarded.

However, when the velocity of the milk bag is the same as the velocity of the thermal imaging camera, the blurring of the image is essentially eliminated and sealing line 420 is discovered to in fact be intact.

These results clearly indicate the advantage of the hereindisclosed system in leveling out the blurring caused by imaging of the container during transport and, as a result thereof, in reducing false negative and false positive evaluations of the container integrity. Inaccurate evaluations leading to unnecessary discarding of milk as well as to failure to discard leaking bags may thus be avoided.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising", when used in this specification, specify the presence of stated features, integers, steps, operations, elements, or components, but do not preclude or rule out the presence or addition of one or more other features, integers, steps, operations, elements, components, or groups thereof.

Unless specifically stated otherwise, as apparent from the following discussions, it is appreciated that throughout the specification discussions utilizing terms such as "processing", "computing", "calculating", "determining", "estimating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

While a number of exemplary aspects and embodiments have been discussed above, those of skill in the art will recognize certain modifications, additions and subcombinations thereof. It is therefore intended that the following appended claims and claims hereafter introduced be interpreted to include all such modifications, additions and sub-combinations as are within their true spirit and scope.

The invention claimed is:

1. A method for determining sealing integrity of a heat-sealed container, the method comprising:
    imaging at least a part of a sealing region of the container using at least one imaging camera operative at a wavelength in the range of 8 μm-14 μm; wherein the imaging is performed before, during and/or after sealing of the container; wherein the imaging is performed during movement and/or transport of the container at a predetermined speed;
    and wherein the imaging is performed while moving the field of view of the camera in a same direction as the container, wherein the moving of the field of view is configured to reduce the velocity of the container relative to the imaging camera sufficiently to reduce smearing of images obtained from the imaging;
    determining, based on at least one frame obtained from the imaging, a sealing efficiency of the container and/or contamination of the sealing region by the filling material.

2. The method according to claim 1, wherein moving the field of view of the camera comprises moving the imaging camera at a second predetermined speed, thereby reducing smearing of the thermal images obtained from the imaging.

3. The method according to claim 2, wherein the second predetermined speed is essentially equal to the predetermined speed of the container's movement/transport.

4. The method according to claim 1, wherein moving the field of view comprises moving and/or rotating an optical element, thereby shifting the field of view of the imaging camera in the same direction as the container.

5. The method according to claim 4, wherein the imaging camera is static.

6. The method according to claim 4, wherein the imaging camera is moving at a second predetermined speed, wherein the combined movement of the imaging camera and the moving/rotating optical element reduces the relative velocity of the container relative to the imaging camera sufficiently to reduce the smearing of the thermal images obtained from the imaging.

7. The method according to claim 1, further comprising cooling at least part of the container after its sealing, prior or during its imaging, thereby accelerating heat dissipation thereof and enabling active thermal dynamic imaging.

8. The method according to claim 1, wherein the predetermined speed of the container's movement/transport is in the range of 200 mm/sec-2000 mm/sec.

9. The method according to claim 1, wherein the container is selected from the group consisting of: a canister; a blister package, a tube, a heat seal bag, a pouch, a sachet, a bottle, or any combination thereof.

10. The method according to claim 1, further comprising heating at least part of the container prior to the imaging thereof; thereby increasing an image contrast between the sealing region and the filling material, wherein the heating of the sealing region is performed prior to, during, or after the filling of the container with filling material.

11. The method according to claim 1, further comprising imaging at least the sealing region of the container at a wavelength in the range of 0.4 µm-0.76 µm (visual spectrum).

12. A packaging system comprising:
a package line comprising at least a sealing station for sealing of the container;
an imaging camera operative at a wavelength in the range of 8 µm-14 µm and configured to image the container before, during and/or after sealing of the container;
wherein the imaging camera is configured to image the container during the container's movement and/or transport at a predetermined speed; and wherein the imaging camera is configured to image the container while a field of view of the camera is moved in a same direction as the container, thereby reducing the relative velocity of the container relative to the imaging camera sufficiently to decrease smearing of thermal images obtained from the imaging; and
a processor configured to determine a sealing efficiency or /and contamination of the sealing region by the filling material of the container, based on images obtained from said first imaging camera.

13. The packaging system according to claim 12, further comprising a moving rail configured to move the imaging camera at a second predetermined speed.

14. The packaging system according to claim 12, further comprising a mobile and/or rotating optical element configured to shift the field of view of the imaging camera in the same direction as the container.

15. The packaging system according to claim 12, wherein the camera is positioned at the sealing station thereof.

16. The packaging system according to claim 12, wherein the predetermined speed of the container's movement/transport is in the range of 200 mm/sec-2000 mm/sec.

17. The packaging system according to claim 12, further comprising a second camera, wherein the imaging by said second camera is performed at a wavelength in the range of 0.4 µm-0.76 µm (visual spectrum).

18. The packaging system according to claim 12, further comprising a cooling device configured to cool the sealed container thereby increasing the thermal dynamics of the obtained image.

19. The method of claim 1, further comprising identifying a trend indicative of and/or responsible for a reduced efficiency in the sealing efficiency, wherein the identifying comprises applying big-data analysis and/or machine learning techniques.

20. The method of claim 19, wherein the trend is caused by one or more of inaccurate nozzle position, speed of packing line movement, heat of filing material, viscosity, press operation or any combination thereof.

* * * * *